United States Patent
Ye et al.

(10) Patent No.: US 8,675,931 B2
(45) Date of Patent: Mar. 18, 2014

(54) MEDICAL IMAGE SEGMENTATION

(75) Inventors: Xujiong Ye, London (GB); Gregory Gibran Slabaugh, London (GB); Gareth Richard Beddoe, London (GB); Xinyu Lin, London (GB); Abdel Douiri, London (GB)

(73) Assignee: Samsung Electronics Co., Ltd., Suwon-Si (KR)

( * ) Notice: Subject to any disclaimer, the term of this patent is extended or adjusted under 35 U.S.C. 154(b) by 304 days.

(21) Appl. No.: 13/002,490

(22) PCT Filed: Jul. 2, 2009

(86) PCT No.: PCT/GB2009/001660
§ 371 (c)(1),
(2), (4) Date: Mar. 29, 2011

(87) PCT Pub. No.: WO2010/001127
PCT Pub. Date: Jan. 7, 2010

(65) Prior Publication Data
US 2011/0293157 A1    Dec. 1, 2011

(30) Foreign Application Priority Data
Jul. 3, 2008 (GB) .................................. 0812206.1

(51) Int. Cl.
*G06K 9/00* (2006.01)
(52) U.S. Cl.
USPC ......................................... 382/128; 382/131
(58) Field of Classification Search
USPC ....................................................... 382/128
See application file for complete search history.

(56) References Cited

U.S. PATENT DOCUMENTS

| | | | | |
|---|---|---|---|---|
| 5,546,515 | A * | 8/1996 | Mochizuki | 345/606 |
| 6,345,112 | B1 | 2/2002 | Summers et al. | |
| 7,379,572 | B2 * | 5/2008 | Yoshida et al. | 382/128 |
| 8,346,513 | B2 * | 1/2013 | Okada et al. | 703/1 |
| 8,520,915 | B2 * | 8/2013 | Ohyu et al. | 382/128 |
| 2004/0208341 | A1* | 10/2004 | Zhou et al. | 382/103 |
| 2005/0259854 | A1* | 11/2005 | Arimura et al. | 382/130 |

(Continued)

FOREIGN PATENT DOCUMENTS

GB    2 395 263 A    5/2004
JP    A-01-238649    9/1989

(Continued)

OTHER PUBLICATIONS

Search Report issued Oct. 24, 2008 in GB0812206.01.

(Continued)

*Primary Examiner* — Tom Y Lu
(74) *Attorney, Agent, or Firm* — Sughrue Mion, PLLC

(57) ABSTRACT

A segmentation method comprises clustering spatial, intensity and volumetric shape index to automatically segment a medical lesion. The algorithm has the following steps: (1) calculating volumetric shape index (SI) for each voxel in the image; (2) combining the SI features with the intensity range and the spatial position (x, y, z) to form a 5-dimensional feature vector set; (3) grouping the 5-dimensional feature vector set into clusters; (4) employing a modified expectation-maximization algorithm (EM) considering not only spatial but also shape features on an intensity mode map from the clustering algorithm to merge the neighbouring regions or modes. The joint spatial-intensity-shape feature provides rich information for the segmentation of the anatomic structures of interest, such as lesions or tumours.

36 Claims, 6 Drawing Sheets

(56) References Cited

U.S. PATENT DOCUMENTS

| | | |
|---|---|---|
| 2006/0050958 A1 | 3/2006 | Okada et al. |
| 2006/0269109 A1 | 11/2006 | Okada et al. |
| 2007/0036409 A1* | 2/2007 | Valadez et al. ............. 382/128 |
| 2007/0081712 A1 | 4/2007 | Huang et al. |
| 2007/0172105 A1 | 7/2007 | Bahlmann et al. |

FOREIGN PATENT DOCUMENTS

| | | |
|---|---|---|
| WO | WO 03/034176 A1 | 4/2003 |
| WO | WO 2007/002146 A2 | 1/2007 |
| WO | WO 2007/079207 A2 | 7/2007 |

OTHER PUBLICATIONS

International Search Report Issued Aug. 12, 2009 in PCT/GB2009/001660.

Kawata et al., "Computer Aided Differential Diagnosis of Pulmonary Nodules Using Curvature Based Analysis," Image Analysis and Processing, International Conference on Proceedings, 1999, Venice, Italy, Sep. 27-29, 1999, Los Alamitos, California, USA, IEEE Comput. Soc, US, Sep. 27, 1999, pp. 470-475.

Coleman et al., "Image Segmentation by Clustering," Proceedings of the IEEE, vol. 67, No. 5, 1979.

Jain et al., "Statistical Pattern Recognition: A Review," IEEE Transactions on Pattern Analysis and Machine Intelligence, IEEE Service Center, Los Alamitos, California, USA, vol. 22, No. 1, Jan. 1, 2000, pp. 4-37.

Bedard et al., "Reducing False-Positive Detections by Combining Two Stage-1 Computer-Aided Mass Detection Algorithms," Medical Imaging 2006: Image Processing, Proc of SPIE, vol. 6144, pp. 61445U1-61445U8.

Kaftan et al., "Fuzzy Pulmonary Vessel Segmentation in Contrast Enhanced CT Data," Medical Imaging 2008: Image Processing, pp. 69141Q1-69141Q12.

Kaftan et al., "Mean Shift Segmentation Evaluation of Optimization Techniques," Proceedings of the Third International Conference on Computer Vision Theory and Applications, VISAPP 2008, pp. 365-374.

de Bruijne et al., "Image Segmentation by Shape Particle Filtering," IEEE, Pattern Recognition, vol. 3, No. 3, pp. 722-725, 2004.

\* cited by examiner

| -908 | -930 | -930 | -930 | -768 | -597 | -585 | -768 | -768 | -855 | -855 |
|------|------|------|------|------|------|------|------|------|------|------|
| -908 | -930 | -930 | -930 | -768 | -597 | -597 | -855 | -855 | -855 | -855 |
| -930 | -930 | -930 | -855 | -768 | -597 | -768 | -900 | -900 | -900 | -896 |
| -908 | -908 | -822 | -597 | -597 | -597 | -768 | -900 | -900 | -900 | -900 |
| -872 | -822 | -822 | -308 | -308 | -308 | -308 | -597 | -768 | -876 | -900 |
| -836 | -836 | -308 | -72  | -72  | -72  | -308 | -308 | -597 | -822 | -876 |
| -698 | -597 | -308 | -72  | -72  | -72  | -72  | -308 | -308 | -698 | -822 |
| -698 | -597 | -72  | -72  | -72  | -72  | -72  | -72  | -308 | -698 | -822 |
| -698 | -597 | -72  | -72  | -72  | -72  | -72  | -72  | -308 | -698 | -822 |
| -698 | -597 | -72  | -72  | -72  | -72  | -72  | -72  | -308 | -698 | -822 |
| -811 | -597 | -308 | -72  | -72  | -72  | -72  | -72  | -308 | -698 | -822 |
| -811 | -811 | -597 | -72  | -72  | -72  | -72  | -72  | -308 | -698 | -892 |
| -836 | -811 | -698 | -597 | -308 | -308 | -308 | -308 | -698 | -867 | -930 |
| -883 | -897 | -836 | -811 | -698 | -698 | -698 | -698 | -811 | -867 | -900 |
| -856 | -883 | -897 | -897 | -897 | -811 | -811 | -811 | -867 | -892 |      |
| -883 | -883 | -883 | -897 | -897 | -897 | -897 | -811 | -811 | -811 | -867 |

| 28 | 0  | 0  | 0  | 48 | 70 | 76 | 48 | 48 | 61 | 61 |
|----|----|----|----|----|----|----|----|----|----|----|
| 28 | 0  | 0  | 0  | 48 | 70 | 70 | 61 | 61 | 61 | 61 |
| 0  | 0  | 0  | 61 | 48 | 70 | 48 | 21 | 21 | 21 | 75 |
| 28 | 28 | 81 | 70 | 70 | 70 | 48 | 21 | 21 | 21 | 21 |
| 58 | 81 | 81 | 86 | 86 | 86 | 86 | 70 | 48 | 54 | 21 |
| 57 | 57 | 86 | 84 | 84 | 84 | 86 | 86 | 70 | 81 | 54 |
| 87 | 70 | 86 | 84 | 84 | 84 | 84 | 86 | 86 | 87 | 81 |
| 87 | 70 | 84 | 84 | 84 | 84 | 84 | 84 | 86 | 87 | 81 |
| 87 | 70 | 84 | 84 | 84 | 84 | 84 | 84 | 86 | 87 | 81 |
| 87 | 70 | 84 | 84 | 84 | 84 | 84 | 84 | 86 | 87 | 81 |
| 81 | 70 | 86 | 84 | 84 | 84 | 84 | 84 | 86 | 87 | 81 |
| 81 | 81 | 70 | 84 | 84 | 84 | 84 | 84 | 86 | 87 | 68 |
| 57 | 81 | 87 | 70 | 86 | 86 | 86 | 86 | 87 | 65 | 0  |
| 28 | 32 | 57 | 81 | 87 | 87 | 87 | 87 | 81 | 65 | 21 |
| 17 | 28 | 32 | 32 | 32 | 32 | 81 | 81 | 81 | 65 | 68 |

MEDICAL IMAGE SEGMENTATION

RELATED APPLICATIONS DATA

This application is a U.S. National Phase Application of International Application No. PCT/GB2009/001660, having an international filing date of Jul. 2, 2009 (WO 2010/001127 A1; published Jan. 7, 2010), which claims priority to Great Britain Application No. GB 0812206.1, filed Jul. 3, 2008, the contents of all of which are incorporated herein by reference in their entirety.

The present invention relates to the automated segmentation of medical images, and to the derivation of models for such automated segmentation.

BACKGROUND TO THE INVENTION

Medical imaging is generally recognized as key to better diagnosis and patient care. It has experienced explosive growth over the last few years due to imaging modalities such as X-ray, computed tomography (CT), ultrasound, and magnetic resonance imaging (MRI). Conventionally, medical images have been inspected visually and the anatomic structures of interest or some lesions (tumours) are manually delineated by trained radiologists. However, the process can be tedious, time consuming and must be performed with great care to accurately delineate the object boundary. To replace some or all of the work of the radiologists, segmentation of medical image data is a prerequisite in computer-assisted diagnosis.

Medical image segmentation is a difficult task because in most cases it is very hard to separate the object from the image background. This is due to the nature of the image acquisition process in which noise is inherent for all medical data, as well as the grey-value mappings of the objects themselves. The resolution of every acquisition device is limited, thus the value of each voxel in medical image represents an averaged value over some neighbouring region, called the partial volume effect. Moreover, the characteristics of the object such as low contrast, small size or location of the object within an area of complicated anatomy bring more critical challenges for automatic segmentation. For example, the intensities of lesions (e.g. juxta-vascular nodule, juxta-pleural nodule or colon polyp) are very similar to the adjacent tissues (e.g. blood vessel or pleural wall). In this case, traditional intensity-based or model-based methods might not properly segment the object.

STATEMENT OF THE INVENTION

According to one aspect of the present invention, there is provided a method of segmenting a three-dimensional medical image, comprising receiving medical image data representing spatial variation of a property of a medical image; deriving shape data from the medical image data; clustering the image data, by means of the medical image data and the shape data, to generate a plurality of modes; and outputting segmentation data relating to said medical image, derived from said modes.

According to another aspect of the present invention, there is provided a method of segmenting a three-dimensional medical image, comprising receiving medical image data representing the spatial variation of a property of a medical image; clustering the medical image data to generate a plurality of modes; merging neighbouring ones of said modes; and outputting segmentation data relating to said medical image, derived from said merged modes.

According to another aspect of the present invention, there is provided a method of segmenting a three-dimensional medical image, comprising receiving medical image data representing the intensity of a plurality of voxels of a medical image; deriving shape data for each of the voxels from the medical image data; composing a plurality of vectors corresponding to the voxels, each vector comprising the three-dimensional coordinates, the intensity and the shape data for the corresponding voxel; clustering the vectors to generate a plurality of modes; merging neighbouring ones of said modes; and outputting segmentation data relating to said medical image, derived from said merged modes.

In one embodiment, a segmentation method comprises clustering spatial, intensity and volumetric shape index to automatically segment a medical lesion. The proposed algorithm has the following steps: (1) calculating volumetric shape index (SI) for each voxel in the image; (2) combining the SI features with the intensity range and the spatial position (x, y, z) to form a 5-dimentional feature vector set; (3) grouping the 5-dimensional feature vector set into clusters; (4) employing a modified expectation-maximization algorithm (EM) considering not only spatial but also shape features on an intensity mode map from the clustering algorithm to merge the neighbouring regions or modes. The joint spatial-intensity-shape feature provides rich information for the segmentation of the anatomic structures of interest, such as lesions or tumours.

A 5-dimensional feature vector is created which not only considers the spatial-range (intensity) information, but also the volumetric shape index feature. That is to say, instead of calculating the shape feature on the segmented object, the shape feature is used during the segmentation process.

A modified expectation-maximization algorithm is applied on the intensity mode map from the clustering algorithm to merge the neighbouring regions or modes. The shape index mode map is used to provide a filtered volumetric shape feature for the calculation of the prior probability. By considering these shape features in the spatial prior probability, the prior probability not only depends on the spatial information, but also the shape information. The joint spatial-intensity-shape feature provides rich information for the segmentation of the anatomic structures of interest or lesions (tumours), particularly where the region of interest is within an area of complicated anatomy and image intensities of different shapes are very similar to each other (such as juxta-vascular nodule, juxta-pleural nodule or colon polyp), in which the traditional intensity-based or model-based methods might not properly segment the object.

The method is preferably implemented on a computer, and the present invention extends to a computer program or computer program product arranged to perform a method according to the invention, as well as to apparatus for carrying out the method.

The present invention can be applied to different types of lesion, such as lung nodules, liver lesions, mammographic masses, and brain lesions. Moreover, the application of the invention is not limited to CT scans, but also can be easily adapted to other modalities such as MRI, PET or X-ray images.

BRIEF DESCRIPTION OF THE DRAWINGS

Embodiments of the invention will now be described with reference to the drawings identified below.

DETAILED DESCRIPTION OF THE EMBODIMENTS

Medical Imaging

The present invention is applicable to digital medical images. One example of such an image is a CT scan image. A CT scan image is a digital image comprising one or a series of CT image slices obtained from a CT scan of an area of a human or animal patient. Each slice is a 2-dimensional digital grey-scale image of the x-ray absorption of the scanned area. The properties of the slice depend on the CT scanner used; for example, a high-resolution multi-slice CT scanner may produce images with a resolution of 0.5-1.0 mmG(pixel in the x and y directions (i.e. in the plane of the slice). Each pixel may have 32-bit greyscale resolution. The intensity value of each pixel may be expressed in Hounsfield units (HU). Sequential slices may be separated by a constant distance along the z direction (i.e. the scan separation axis); for example, by a distance of between 0.5-2.5 mm. Hence, the scan image may be a three-dimensional (3D) greyscale image, with an overall size depending on the area and number of slices scanned. Each pixel may then be a voxel in three-dimensional space. Alternatively, the scan image may comprise a single slice and therefore be a single two-dimensional (2D) greyscale image.

The CT scan may be obtained by any CT scanning technique, such as electron beam computed tomography (EBCT), multi-detector or spiral scan or any technique which produces as output a 2D or 3D image representing X-ray absorption.

The invention is not limited to CT scan images, but may be applied to other digital medical images, such as MRI, ultrasound or X-ray images. Conventional X-ray images may be developed on an X-ray film prior to being digitised.

Computer System

Figure 1:
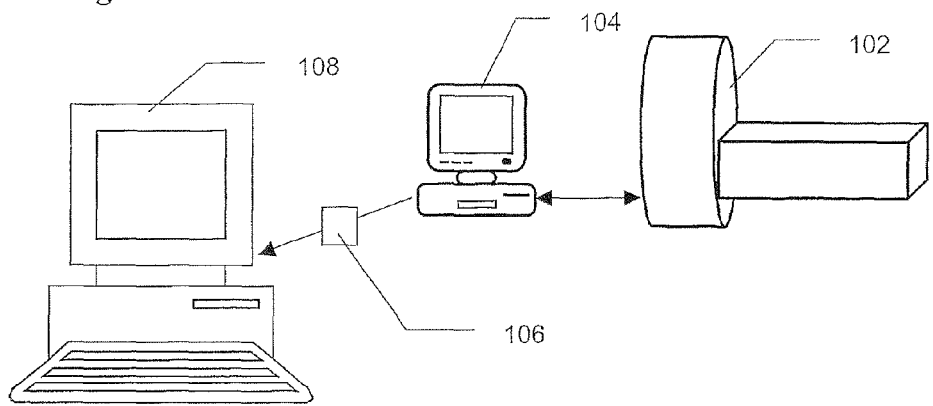
FIG. 1 is a schematic diagram showing a medical imaging device and a remote computer for processing image data from the medical imaging device.

As shown in FIG. 1, the scan image may be created by a computer 104, which receives scan data from a scanner 102 and constructs the scan image. The scan image is saved as an electronic file or a series of files, which are stored on a storage medium 106, such as a fixed or removable disc. The scan image may include metadata associated with the scan image. The scan image may be analysed by the computer 104, or the scan image may be transferred to another computer 108 which runs software for processing the scan image, for example as described below. The software may be stored on a carrier, such as a removable disc or a solid-state memory, or downloaded over a network such as a local area network (LAN), wide-area network (WAN), an internet or the Internet.

Figure 2:
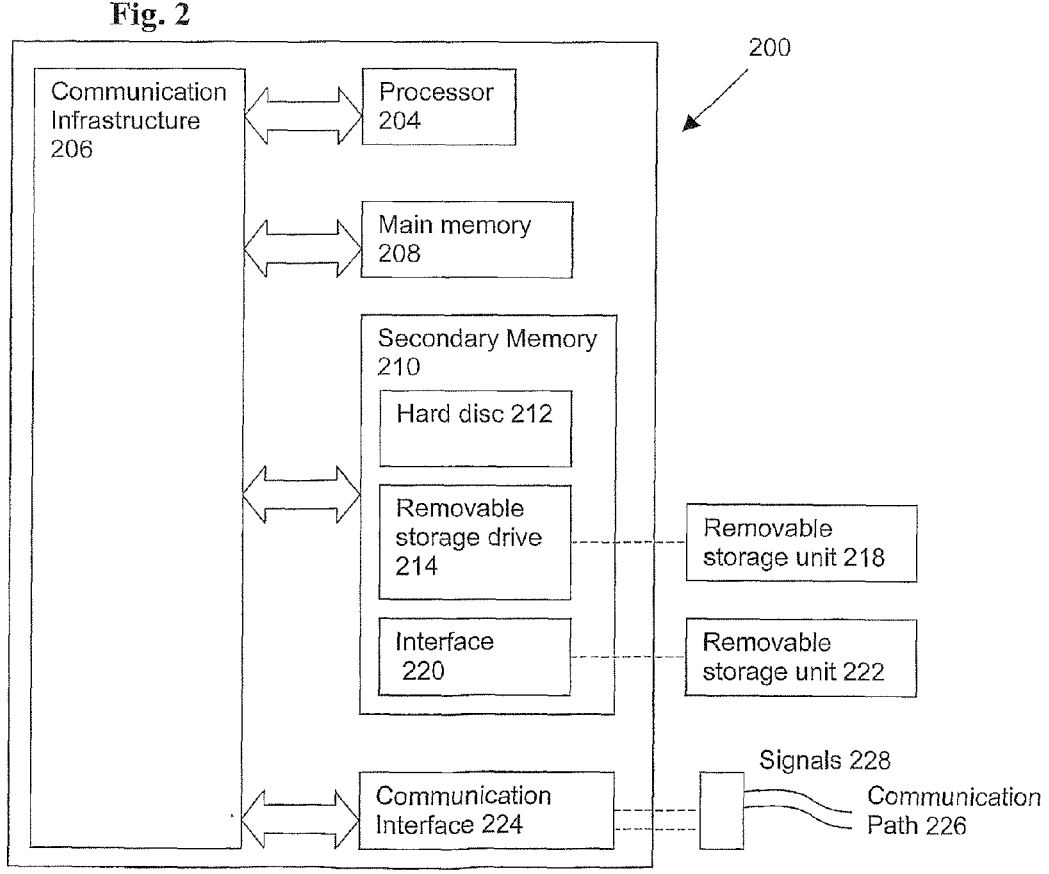
FIG. 2 is a more detailed diagram of the remote computer.

The computers described herein may be computer systems 200 as shown in FIG. 2. Embodiments of the present invention may be implemented as programmable code for execution by the computer system 200. Various embodiments of the invention are described in terms of this example computer system 200. After reading this description, it will become apparent to a person skilled in the art how to implement the invention using other computer systems andG(or computer architectures.

Computer system 200 includes one or more processors, such as processor 204. Processor 204 may be any type of processor, including but not limited to a special purpose or a general-purpose digital signal processor. Processor 204 is connected to a communication infrastructure 206 (for example, a bus or network). Various software implementations are described in terms of this exemplary computer system. After reading this description, it will become apparent to a person skilled in the art how to implement the invention using other computer systems andG(or computer architectures.

Computer system 200 also includes a main memory 208, preferably random access memory (RAM), and may also include a secondary memory 210. Secondary memory 210 may include, for example, a hard disk drive 212 andG(or a removable storage drive 214, representing a floppy disk drive, a magnetic tape drive, an optical disk drive, etc. Removable storage drive 214 reads from andG(or writes to a removable storage unit 218 in a well-known manner. Removable storage unit 218 represents a floppy disk, magnetic tape, optical disk, etc., which is read by and written to by removable storage drive 214. As will be appreciated, removable storage unit 218 includes a computer usable storage medium having stored therein computer software andG(or data.

In alternative implementations, secondary memory 210 may include other similar means for allowing computer programs or other instructions to be loaded into computer system 200. Such means may include, for example, a removable storage unit 222 and an interface 220. Examples of such means may include a program cartridge and cartridge interface (such as that previously found in video game devices), a removable memory chip (such as an EPROM, or PROM, or flash memory) and associated socket, and other removable storage units 222 and interfaces 220 which allow software and data to be transferred from removable storage unit 222 to computer system 200. Alternatively, the program may be executed andG(or the data accessed from the removable storage unit 222, using the processor 204 of the computer system 200.

Computer system 200 may also include a communication interface 224. Communication interface 224 allows software and data to be transferred between computer system 200 and external devices. Examples of communication interface 224 may include a modem, a network interface (such as an Ethernet card), a communication port, a Personal Computer Memory Card International Association (PCMCIA) slot and card, etc. Software and data transferred via communication interface 224 are in the form of signals 228, which may be electronic, electromagnetic, optical, or other signals capable of being received by communication interface 224. These signals 228 are provided to communication interface 224 via a communication path 226. Communication path 226 carries signals 228 and may be implemented using wire or cable, fibre optics, a phone line, a wireless link, a cellular phone link, a radio frequency link, or any other suitable communication channel. For instance, communication path 226 may be implemented using a combination of channels.

In this application, the terms "computer program medium" and "computer usable medium" are used generally to refer to media such as removable storage drive 214, a hard disk installed in hard disk drive 212, and signals 228. These computer program products are means for providing software to computer system 200.

Computer programs (also called computer control logic) are stored in main memory 208 andG(or secondary memory 210. Computer programs may also be received via communication interface 224. Such computer programs, when executed, enable computer system 200 to implement the present invention as discussed herein.

Accordingly, such computer programs represent controllers of computer system 200. Where the invention is implemented using software, the software may be stored in a computer program product and loaded into computer system 200 using removable storage drive 214, hard disk drive 212, or communication interface 224, to provide some examples.

In alternative embodiments, the invention can be implemented as control logic in hardware, firmware, or software or any combination thereof.

Methods according to embodiments of the invention will now be described. Except where specified otherwise, it will be appreciated that the methods may be implemented in software in a computer system such as the computer system 200. References to a step being performed 'automatically' may encompass performance by such software, preferably without user intervention.

Segmentation Method Overview

Figure 3:
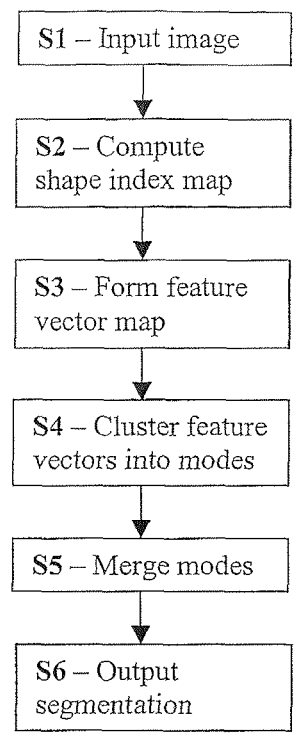
FIG. 3 is a flowchart illustrating method steps in an embodiment of the invention.

FIG. 3 shows the steps in the segmentation method of an embodiment of the invention.

At step S1, the image is provided as input, in the form of digital data representing the three-dimensional positions of a set of voxels in a medical image, together with image intensity data for each voxel. The image may be a part of a larger image, for example selected as an area of interest for segmentation.

At step S2, a shape index value is computed for each voxel. The shape index value is preferably a volumetric shape index value representing three-dimensional shape at each voxel, and may be independent of the absolute value of intensity at each voxel.

At step S3, the three-dimensional coordinates of each voxel are combined with the intensity value and shape index value for each voxel to generate a set of 5-dimensional vectors corresponding to the voxels.

At step S4, the vectors are clustered into modes, such that the similarity of vectors within a mode is higher than that between modes.

At step S5, the modes are merged into segments, for example using modified expectation-maximization considering spatial and shape features. This step is advantageous in that it provides an appropriate level of segmentation, but may be optional in some circumstances if the number of modes in step S4 meets the required number of segments.

At step S6, the derived segmentation of the image is output, for example as a display, or as an input for further processing or analysis of the image.

These steps need not all be performed on the same processor or computer system, or by the same software application. For example, one or more of steps S1 to S3 may be performed as discrete pre-processing operations, while one or more of steps S5 to S6 may be performed as discrete post-processing operations.

Image Input

In step S1 the image to be segmented, or the required section of the image, is input as image data, as described for example in the Medical Imaging andG(or Computer System sections above. The image data may be formatted as a 3D matrix of intensity values corresponding to a set of voxels, with the coordinates of the voxels being implicit from the known voxel pitch in each dimension. Alternatively, the image data may be formatted as a set of four-dimensional vectors, representing the three-dimensional coordinates of each voxel in the set, together with the corresponding intensity value. The image data may have been pre-processed, for example to reduce noise or to remove features not required for segmentation. It is not essential that the image data represents a complete set of contiguous voxels, although the voxels should be sufficiently contiguous or adjacent to allow computation of a shape index map as described below.

Shape Index Computation

In step S2, a shape index value is computed for each voxel, representing a 3D geometrical feature around the voxel. The shape index value represents the local shape feature at each voxel while preferably being independent of the image intensity. Every distinct shape, except for a plane, corresponds to a unique shape index. For example, a shape index value of 1.00 indicates a sphere-like shape, and 0.75 indicates a cylinder-like shape. The volumetric shape index may directly characterize the topological shape of an iso-surface in the vicinity of each voxel without explicitly calculating the iso-surface.

The shape index value may be calculated from Gaussian and mean curvatures based on the first and second fundamental forms of differential geometry. A practical approach for computing the first and second fundamental forms at each voxel p is to use the smoothed first and second partial derivatives of x, y, z, as described by H. Yoshida and J. Nappi, "Three-dimensional computer-aided diagnosis scheme for detection of colonic polyps", IEEE Trans. Medical Imaging, vol. 20, no. 12, pp. 1261-1273, 2001.

In one specific example, the volumetric shape index value at each voxel is defined as:

$$SI(p) = \frac{1}{2} - \frac{1}{\pi}\arctan\frac{k_1(p) + k_2(p)}{k_1(p) - k_2(p)} \quad (1)$$

where $k_1(p)$ and $k_2(p)$ are the principal curvatures at voxel p, which are defined as:

$$k_1(p) = H(p) + \sqrt{H^2(p) - K(p)}, k_2(p) = H(p) - \sqrt{H^2(p) - K(p)} \quad (2)$$

where $K(p)$ and $H(p)$ are the Gaussian and mean curvatures.

The Gaussian and mean curvatures for each voxel may be determined from a Hessian matrix, for example as described by J. Koenderink and A. J van Doom, "Surface shape and curvature scales," Image and Vision Computing, 10, 557-565, 1992. The Hessian matrix captures the local differential structure around each voxel. In another alternative, the eigenvalues of the Hessian matrix are used directly to calculate the shape index values.

Figure 4A:
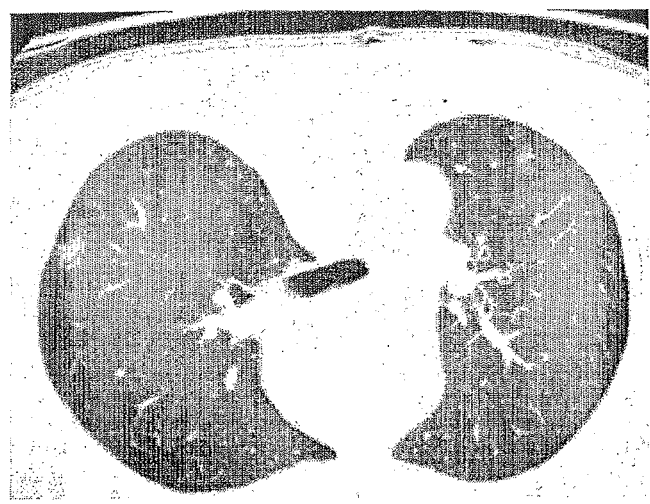
FIGS. 4a and 4b are respectively a two-dimensional slice of medical image containing nodules and blood vessels, and a shape index map thereof.
Figure 4B:
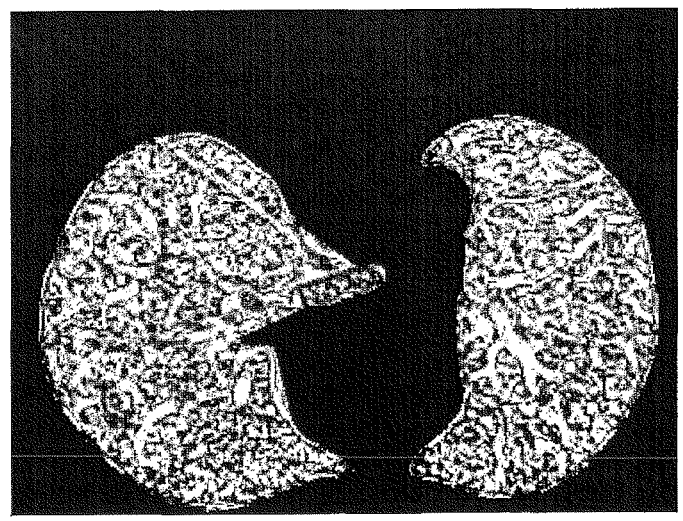

To illustrate the characteristics of the shape index, FIGS. 4a and 4b show a two-dimensional slice of an original lung image and its corresponding shape index map. Tables 1 and 2 below show shape index values for a sphere-like nodule and a cylinder-like blood vessel, respectively; the average of the shape index values for the nodule is higher than that of the blood vessel.

TABLE 1

| Shape index values for a nodule | | | | |
|---|---|---|---|---|
| 0.96 | 0.88 | 0.87 | 0.83 | 0.80 |
| 0.86 | 0.91 | 0.96 | 0.82 | 0.82 |
| 0.86 | 0.92 | 0.97 | 0.91 | 0.92 |
| 0.80 | 0.94 | 0.90 | 0.90 | 0.94 |
| 0.81 | 0.80 | 0.81 | 0.91 | 0.91 |
| 0.86 | 0.84 | 0.82 | 0.86 | 0.90 |

TABLE 2

Shape index values for a blood vessel

| | | | | |
|---|---|---|---|---|
| 0.72 | 0.71 | 0.72 | 0.73 | 0.73 |
| 0.75 | 0.74 | 0.74 | 0.73 | 0.74 |
| 0.77 | 0.72 | 0.76 | 0.76 | 0.73 |
| 0.74 | 0.75 | 0.77 | 0.75 | 0.74 |
| 0.72 | 0.70 | 0.76 | 0.77 | 0.76 |
| 0.73 | 0.74 | 0.74 | 0.77 | 0.75 |

Forming Feature Vectors

For each voxel, the shape index value, the image intensity value and the three-dimensional coordinates of the voxel are combined to create a 5-dimensional vector in a 5-dimensional space $R^5$, at step S3. As with the input image data, the 3-dimensional coordinates of each voxel may be represented explicitly in the feature vector, or implicitly from the location of the voxel within a three-dimensional matrix. For example, at each voxel, a 5-dimensional vector could be represented by an intensity, a shape index, and the 3-dimensional coordinate of the voxel being derived from its position within the matrix.

Clustering

At step S4, the vectors are clustered into modes. Clustering involves a feature space-based algorithm, which partitions a data set into several modes (otherwise known as clusters or groups) such that the similarity within a mode is larger than that between modes. The goal of image segmentation under feature space analysis is delineation of these modes. Two alternative non-parametric clustering methods, which may be applied in embodiments of the invention, are discussed in the following sections: mean shift clustering and subtractive clustering. However, other clustering methods may be used.

Mean Shift Clustering

The mean shift method is a very effective method of feature space clustering. It is a non-parametric estimator of density gradient that does not require prior knowledge of the number of clusters, and does not constrain the shape of the clusters. The mean shift method jointly takes into account both spatial information, such as voxel location in the spatial domain, and feature information, such as intensity level and shape features. In the mean shift method, features can be easily integrated into the process of segmentation rather than just calculating them after segmentation. By using feature-guided segmentation, accurate object boundary delineation can be obtained.

Given n data points $x_i$, i=1, ..., n in a d-dimensional space $R^d$, the multivariate kernel density estimate obtained with kernel K(x) and window radius h is:

$$f(x) = \frac{1}{nh^d} \sum_{i=1}^{n} K\left(\frac{x - x_i}{h}\right) \quad (3)$$

For radially symmetric kernels, it suffices to define the profile of the kernel k(x) satisfying:

$$K(x) = c_{k,d} k(\|x\|^2) \quad (4)$$

where $c_{k,d}$ is a normalization constant which assures K(x) integrates to 1.

The modes of the density function are defined at the zeros of the gradient function, namely $\nabla f(x) = 0$.

The gradient of the density estimator (3) is:

$$\nabla f(x) = \frac{2 c_{k,d}}{n h^{d+2}} \left[ \sum_{i=1}^{n} g\left(\left\|\frac{x - x_i}{h}\right\|^2\right) \right] \cdot \left[ \frac{\sum_{i=1}^{n} x_i g\left(\left\|\frac{x - x_i}{h}\right\|^2\right)}{\sum_{i=1}^{n} g\left(\left\|\frac{x - x_i}{h}\right\|^2\right)} - x \right] \quad (5)$$

where g(s)=k'(s). The first term is proportional to the density estimate at x computed with kernel $G(x) = c_{g,d} g(\|x\|^2)$ and the second term:

$$m_h(x) = \frac{\sum_{i=1}^{n} x_i g\left(\left\|\frac{x - x_i}{h}\right\|^2\right)}{\sum_{i=1}^{n} g\left(\left\|\frac{x - x_i}{h}\right\|^2\right)} - x \quad (6)$$

is the mean shift. The mean shift vector always points toward the direction of the maximum increase in the density.

The mean shift algorithm consists of the following steps:
1) Select a start point $x^0$;
2) Compute the mean shift vector $m_h(x^t)$;
3) Move the feature point from $x^t$ to $x^{t+1}$ according the iterative equation $x^{t+1} = x^t + m_h(x^t)$;
4) If $\|x^t - x^{t+1}\| < \epsilon$, then group all the points on the path from the start point $x^0$ to $x^t$ into a cluster centred with $x^{t+1}$.

The mean shift method is an adaptive gradient ascent method. The mean shift vector size depends on the gradient itself: when it is near local maxima, the step is small and refined. By acting in the joint spatial-intensity domain, mean shift brings together many voxels with potentially significant intensity variations into a few modes, which is a mode map.

Shape Index in Mean Shift Clustering

Given n data points $x_i$, i=1, ..., n on the 5-dimensional space $R^5$, (where n is the total number of voxels in the image), the multivariate kernel is defined as the product of three radially symmetric kernels and the Euclidean metric allows single window radius h for each kernel function:

$$K_{h_s h_r h_{si}}(x) = c_{k,5} k\left(\left\|\frac{x^s}{h_s}\right\|^2\right) \cdot k\left(\left\|\frac{x^r}{h_r}\right\|^2\right) \cdot k\left(\left\|\frac{x^{si}}{h_{si}}\right\|^2\right) \quad (7)$$

where $x^s$ is the spatial location, $x^r$ is the grey level range and $x^{si}$ is the shape index feature; k(x) is the common profile used in all the domains; $h_s$, $h_r$ and $h_{si}$ are the kernel window size for spatial, range and shape index kernel function, respectively. Each kernel window size can be set to a fixed constant or determined adaptively based on the image data.

By using the mean shift method, the shape index feature can be combined into the intensity feature for object segmentation. This section describes a non-limiting example using mean shift; similar results can be achieved using subtractive clustering. Mean shift clustering estimates the modes of the multivariate distribution underlying the feature space. The number of clusters is obtained automatically by finding the centres of the densest regions in the space (the modes). Similar to equation (6), the mean shift vector with three kernel windows (spatial kernel window, intensity kernel window and shape index kernel window) can be calculated as:

$$m_{h_i h_s h_{si}}(x_i) = \frac{\sum_{i=1}^{n} x_i g\left(\left\|\frac{x^s}{h_s}\right\|^2\right) \cdot g\left(\left\|\frac{x^r}{h_r}\right\|^2\right) \cdot g\left(\left\|\frac{x^{si}}{h_{si}}\right\|^2\right)}{\sum_{i=1}^{n} g\left(\left\|\frac{x^s}{h_s}\right\|^2\right) \cdot g\left(\left\|\frac{x^r}{h_r}\right\|^2\right) \cdot g\left(\left\|\frac{x^{si}}{h_{si}}\right\|^2\right)} - x_i \quad (8)$$

The joint shape index-intensity mean shift procedures can be obtained by:
1) Computation of the mean shift vector $m_{h_i h_s h_{si}}(x_i^t)$ based on equation (8);
2) If $\|m_{h_i h_s h_{si}}(x_i^t)\| < \epsilon$ (where $\epsilon$ is a pre-defined threshold), then stop; otherwise, do step 3) below:
3) Translation of the window $x_i^{t+1} = x_i^t + m_{h_i h_s h_{si}}(x_i^t)$ The above procedure is guaranteed to converge to a point $x_i^{t+1}$ where the gradient of density function is zero (mode). After convergence, the detected modes are the cluster centres.

Figure 5A:
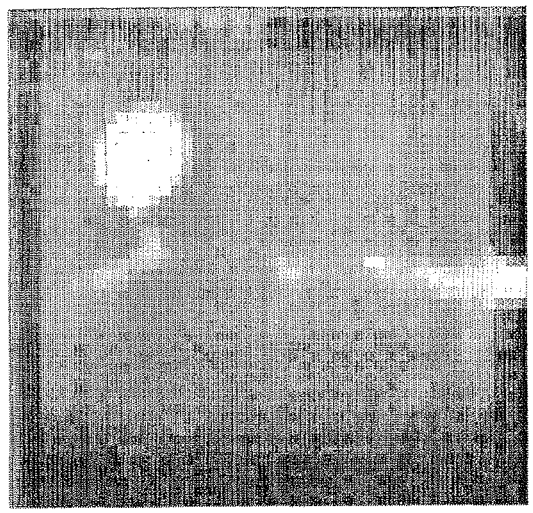
FIGS. 5a to 5e are respectively: a sample medical image; an intensity mode map thereof; a table of intensity mode values around a nodule area in the intensity mode map; a shape index mode map of the image; and a table of shape index mode values around a nodule area in the shape index mode map.
Figures 5B, 5C:
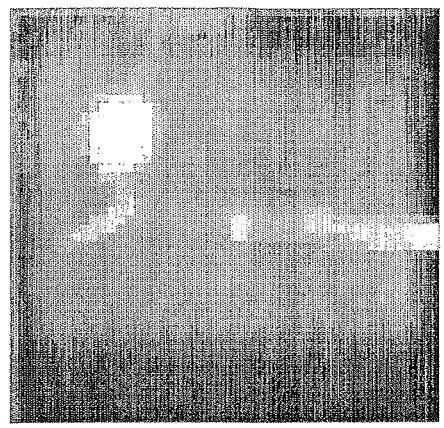
Figures 5D, 5E:
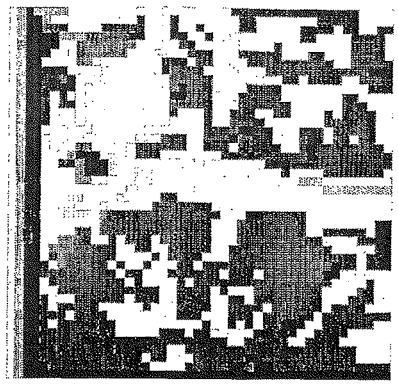

By way of example, FIG. 5a is an image of a nodule attached to a vessel. FIGS. 5b and 5d are respectively intensity and shape index mode maps of the image created using the joint spatial-shape index-intensity mean shift embodiment described above. FIGS. 5c and 5e show the mode values around the nodule area, corresponding to FIGS. 5b and 5d respectively. The mode intensities can be seen as "filtered" values for the original voxels and are less contaminated by outliers.

As shown in FIG. 5c, the nodule can be segmented from the background (in this case, a blood vessel) as indicated by the mode value "−72" in the intensity mode map. In FIG. 5e, a high shape index mode value (e.g. 84) is obtained in the nodule area while the values are much lower for the background.

Subtractive Clustering

Subtractive clustering is an alternative approach, in which data points are considered as the candidates for cluster centres.

Given n data points $x_i$, i=1, . . . , n on a d-dimensional space $R^d$, and assuming each data point is a candidate for cluster centres, a density measure at data point $x_i$ is defined as:

$$D_i = \sum_{j=1}^{n} \exp\left(-\frac{\|x_i - x_j\|^2}{(\gamma_a/2)^2}\right)^2 \quad (9)$$

where $\gamma_a$ is a positive constant, which defines a neighbourhood. Hence, a data point will have a high density value if it has many neighbouring data points.

After the density measure of each data point has been calculated, the data point with the highest density measure is selected as the first cluster centre. Let $x_{c_1}$ be the point selected and $D_{c_1}$ its density measure. Next, the density measure for each data point $x_i$ is revised by the formula:

$$D_i = D_i - D_{c_1} \exp\left(-\frac{\|x_i - x_{c_1}\|^2}{(\gamma_b/2)^2}\right) \quad (10)$$

where $\gamma_b$ is a positive constant. Therefore, the data points near the first cluster centre $x_{c_1}$ will have a significantly reduced density measure which makes the points unlikely to be selected as the next cluster centre. The constant $\gamma_b$ is normally larger than $\gamma_a$ to prevent closely spaced cluster centres; generally $\gamma_b$ is equal to $1.5\gamma_a$.

After the density measure for each data point is revised, the next cluster $x_{c_2}$ is selected and all of the density measures for data points are revised again. This process is repeated until a sufficient number of cluster centres are generated.

Merging Modes

Two mode maps are created by the clustering algorithm: the intensity mode map ($M_i$) and the shape index mode map ($M_{si}$). Each mode expresses the local structure of the data in a given region of the feature space. The number of modes depends on the kernel window size and the data structure. Although this number is a large compression of the initial data, it may still be larger than the targeted number of classes; in this case there is an over-segmentation problem, which means the desired object to be segmented is split into too many small segmented objects.

To merge the different G(close modes as in step S5, one embodiment uses a graph-theoretic method, such as J. Shi, J. Malik, "Normalized Cuts and Image Segmentation," IEEE Transactions on Pattern Analysis and Machine Intelligence, vol. 22, no. 8, 2000. Such a method could be adapted to contain edge weights computed from the intensity and shape index mode maps. Another embodiment uses a novel Mixture Gaussian model with expectation-maximization (EM) considering the spatial and shape information from the shape index mode map, which can be used on the intensity mode map $M_i$. Based on Bayesian probability theory, for each mode, the probability of the mode belonging to one class is defined as:

$$p(\varphi_l | M_i) = \frac{p_l(M_i | \varphi_l) \cdot p(\varphi_{l(i)})}{\sum_l p_l(M_i | \varphi_l) \cdot p(\varphi_{l(i)})} \quad (11)$$

$l = 1, 2, \ldots, n$ where, $p_l(M_i|\phi_l)$ the lth Gaussian model with parameter $\phi_l=(\mu_l, \sigma_l)$ (mean $\mu_l$ and standard deviation $\sigma_l$). $p(\phi_{l(i)})$ is a spatial prior probability.

Each mode is assigned to the Gaussian component for which it gives the highest likelihood, $$l_i^* = \arg\max_l p(\varphi_l | M_i) \quad (12)$$

The spatial prior probability $p(\phi_{l(i)})$ plays an important role in equation (11). The spatial constraint can be imposed by a Markov Random Field (MRF) and Gibbs Random Field (MRF-GRF) as:

$$p(\varphi_{l(i)}) \approx p(l_i | l_{N(i)}) = \frac{\exp\left[-\sum_c v_c(l_i)\right]}{\sum_{l_i \in \hat{L}} \exp\left[-\sum_c v_c(l_i)\right]} \quad (13)$$

where N(i) is the neighbourhood of mode i. $v_c(l_i)$ is a potential function associated with the clique c which is defined as:

$$v_c(l_i) = -\beta \cdot p(\phi_l | M_j)_{j \in c} \quad (14)$$

Here, a second-order neighbourhood system and pairwise interaction clique between neighbours are considered. $\beta$ is a positive constant which controls the size of clustering.

Similarly to the intensity mode map, the shape index mode map ($M_{si}$) provides significant shape information. By considering these shape features in the spatial prior probability, the prior probability not only depends on the spatial information, but also the shape information. The spatial shape based prior probability can be defined as:

$$p(\varphi_{l_{(i)}}) \approx p(l_i | l_{N(i)}) \cdot w_{si} = \frac{\exp\left[-\sum_c v_c(l_i)\right]}{\sum_{l_i \in \hat{L}} \exp\left[-\sum_c v_c(l_i)\right]} \cdot \frac{M_{si}(i)}{\frac{1}{N_c} \cdot \sum_c M_{si}(N(i))} \quad (15)$$

Where $N_c$ is the total number of cliques, and $w_{si}$ is a weighting factor considering the shape information.

It can be seen that, if a voxel under the consideration has the similar shape as that of the neighbourhood voxels, a high weighting is assigned to a voxel which gives a high probability that the voxel belongs to the same class as that of the neighbouring voxels. By combining the shape feature into equation (15), the prior probability not only takes into account the spatial information, but also the shape information. This may provide better segmentation compared to only considering the spatial information on the intensity mode map ($M_i$).

Segmentation Output

At step S6, the modes or groups identified at step S4 may be output so as to indicate segmentation of the image input at step S1. For example, the intensity mode map andG(or the shape index mode map may be output, since these indicate the segmentation of objects within the image. Thresholding may be applied to either mode map, so as to provide a binary segmentation map or at least to reduce the number of indicated modes. Alternatively or additionally, the merged modes obtained at step S5 may be output at step S6, in embodiments where step S6 is performed. For example, the Gaussian component resulting in the highest likelihood may be output.

The segmentation information may be output for display, for example so as to highlight the different objects identified in the image, or to remove or suppress those parts of the image identified as background. Alternatively or additionally, the segmentation may be output to a process which analyses the image, for example to determine whether an object identified by the segmentation process is likely to represent a lesion.

Alternative Embodiments

The present invention may be applied to different types of lesion, such as lung nodules, liver lesions, mammographic masses, and brain lesions. Segmentation techniques appropriate to the required lesion type may be used.

The application of the invention is not limited to CT scans; for example, aspects of the invention may be applied to MRI, PET or X-ray images.

Alternative embodiments of the invention may be apparent from reading the above description. Such alternative embodiments may nevertheless fall within the scope of the present invention.

The invention claimed is:

1. A method for segmenting a three-dimensional medical image, comprising:
   receiving, by a computing device, medical image data representing spatial variation of the three-dimensional medical image;
   deriving, by the computing device, shape data from the medical image data;
   clustering, by the computing device, image data including the medical image data and the shape data, to generate a plurality of modes;
   merging neighboring ones of said plurality of modes to form merged modes; and
   outputting, by the computing device, segmentation data relating to the three-dimensional medical image, derived from the plurality of modes, wherein the segmentation data is based on the merged modes.

2. The method of claim 1, wherein the medical image data represents a spatial intensity variation of the three-dimensional medical image.

3. The method of claim 1, wherein the shape data represents a volumetric shape index of the three-dimensional medical image.

4. The method of claim 1, wherein the shape data is based on a Gaussian curvature.

5. The method of claim 1, wherein the shape data is based on a mean curvature.

6. The method of claim 1, wherein the shape data is determined from a Hessian matrix.

7. The method of claim 6, wherein the shape data is calculated from eigenvalues of the Hessian matrix.

8. The method of claim 1, wherein said clustering comprises clustering a set of vectors each comprising a spatial location within the three-dimensional image, a corresponding medical image datum, and a corresponding shape datum.

9. The method of claim 1, wherein said clustering generates a mode map corresponding to the medical image data.

10. The method of claim 1, wherein said clustering generates a mode map corresponding to the shape data.

11. The method of claim 1, wherein said clustering comprises a mean shift clustering step.

12. The method of claim 1, wherein said clustering comprises a subtractive clustering step.

13. The method of claim 1, wherein said clustering uses an adaptive kernel window size.

14. The method of claim 1, wherein said merging comprises an expectation-maximization step.

15. The method of claim 14, wherein the expectation, maximization step is based on the shape data.

16. The method of claim 14, wherein the expectation-maximization step includes calculating a spatial prior probability.

17. The method of claim 16, wherein the spatial prior probability involves a spatial constraint.

18. The method of claim 17, wherein the spatial constraint is imposed by a Markov Random Field.

19. The method of claim 17, wherein the spatial constraint is imposed by a Gibbs random field.

20. The method of claim 16, wherein the spatial prior probability involves a shape constraint.

21. The method of claim 1, wherein said merging comprises a graph- theoretic step.

22. The method of claim 1, wherein at least one of said receiving deriving, clustering; and outputting is performed automatically by the computing device.

23. The method of claim 1, wherein the three-dimensional medical image is an image of at least part of a colon.

24. The method of claim 23, wherein the segmentation data extracts a polyp from the three-dimensional medical image.

25. The method of claim 1, wherein the three-dimensional medical image is an image of at least part of a lung.

26. The method of claim 25, wherein the segmentation data extracts a lesion from the three-dimensional medical image.

27. The method of claim 1, wherein the three-dimensional medical image is a computed tomography (CT) image.

28. The method of claim 1, wherein the three-dimensional medical image is a magnetic resonance (MR) image.

29. The method of claim 1, wherein the three-dimensional medical image is an X-ray image.

30. The method of claim 1, wherein the three-dimensional medical image is an ultrasound image.

31. A method for segmenting a three-dimensional medical image, comprising:
receiving, by a computing device, medical image data representing a spatial variation of a property of the three-dimensional medical image;
clustering, by the computing device, the medical image data to generate a plurality of modes;
merging, by the computing device, neighbouring ones of the plurality of modes to form merged modes; and
outputting, by the computing device, segmentation data relating to the three-dimensional medical image, derived from the merged modes.

32. A method for segmenting a three-dimensional medical image, comprising:
receiving, by a computing device, medical image data representing the intensity of a plurality of voxels of the three-dimensional medical image;
deriving, by the computing device, shape data for respective voxels from the medical image data;
composing, by the computing device, a plurality of vectors corresponding to the voxels, each vector comprising three-dimensional coordinates, intensity data, and the-shape data for a corresponding voxel;
clustering, by the computing device, the plurality of vectors to generate a plurality of modes;
merging, by the computing device, neighbouring ones of the plurality of modes to form merged modes; and
outputting, by the computing device, segmentation data relating to the three-dimensional medical image, derived from the merged modes.

33. A method for segmenting a three-dimension medical image, comprising;
clustering, by a computing device, spatial feature data of the three-dimensional medical image, including shape data,
merging neighboring results of the clustering, and
segmenting, by the computing device, the three-dimensional medical image based on said clustering and said merging.

34. A medical imaging apparatus, comprising:
a memory and processor configured to:
receive medical image data representing spatial variation of the three-dimensional medical image;
derive shape data from the medical image data;
cluster image data, including the medical image and the shape data, to generate a plurality of modes;
merge neighboring ones of said plurality of modes to form merged modes; and
output segmentation data relating to the three-dimensional medical image, derived from the plurality of modes, wherein the segmentation data is based on the merged modes.

35. A non-transitory computer-readable storage medium having stored thereon computer executable instructions, execution of which by a computing device causes the computing device to perform operations for segmenting a three-dimensional medical image, the operations comprising:
receiving medical image data representing spatial variation of the three-dimensional medical image;
deriving shape date from the medical image data;
clustering image data, including the medical image data and the shape data, to generate a plurality of modes;
merging neighboring ones of said plurality of modes to form merged modes; and
outputting segmentation data relating to the three-dimensional medical image, derived from the plurality of modes, wherein the segmentation data is based on the merged modes.

36. A medical imaging apparatus, comprising:
means for receiving medical image data representing spatial variation of the three-dimensional medical image;
means for deriving shape data from the medical image data;
means for clustering image data, including the medical image data and the shape data, to generate a plurality of modes;
means for merging neighboring ones of said plurality of modes to form merged modes; and
means for outputting segmentation data relating to the three-dimensional medical image, derived from the plurality of modes, wherein the segmentation data is based on the merged modes.

* * * * *